United States Patent
Choi et al.

(10) Patent No.: US 6,690,665 B1
(45) Date of Patent: Feb. 10, 2004

(54) DEVICE AND METHOD FOR MOBILE STATION FOR RECEIVING SIGNALS TRANSMITTED FROM A BASE STATION

(75) Inventors: Jin-Woo Choi, Songnam-shi (KR); Soon-Young Yoon, Seoul (KR); Jong-Han Kim, Yongin-shi (KR); Su-Won Park, Seoul (KR); Jae-Heung Yeom, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/311,547

(22) Filed: May 13, 1999

(30) Foreign Application Priority Data

May 13, 1998 (KR) .......................................... 98/17279
May 13, 1998 (KR) .......................................... 98/17280

(51) Int. Cl.[7] .............................................. H04L 12/50
(52) U.S. Cl. ...................................... 370/376; 370/318
(58) Field of Search .............................. 370/328, 329, 370/334, 335, 342, 318, 209, 211, 212, 376, 311, 314, 321, 219, 324, 350, 326, 347, 345, 363, 378, 428, 535, 330, 442; 375/465, 204, 368, 372, 346, 347, 348, 349, 350, 298, 299, 254, 267, 261; 455/10, 13.4, 25, 504, 506, 67.2, 101, 103, 135, 140, 19

(56) References Cited

U.S. PATENT DOCUMENTS

| | | | | |
|---|---|---|---|---|
| 5,671,221 A | * | 9/1997 | Yang .......................... 370/320 |
| 5,737,327 A | * | 4/1998 | Ling et al. .................. 370/318 |
| 5,809,083 A | * | 9/1998 | Wright ....................... 370/500 |
| 5,881,056 A | * | 3/1999 | Huang et al. ............... 370/335 |
| 5,926,503 A | * | 7/1999 | Kelton et al. ............... 375/148 |
| 6,137,788 A | * | 10/2000 | Sawahashi et al. ......... 370/342 |
| 6,178,194 B1 | * | 1/2001 | Vasic ......................... 375/136 |
| 6,185,258 B1 | * | 2/2001 | Alamouti et al. ........... 375/260 |

* cited by examiner

Primary Examiner—Dang Ton
(74) Attorney, Agent, or Firm—Dilworth & Barrese, LLP

(57) ABSTRACT

A receiving device for a mobile station receives signals transmitted from a base station having a time-switched transmission diversity (TSTD) function. In the receiving device, a despreader despreads channel signals which have been transmitted in a TSTD mode of operation. A pilot separator separates a pilot signal from the despread channel signals. A channel estimator generates a channel estimation signal by selecting pilot signals transmitted from a same antenna of a transmitter according to a TSTD pattern of the transmitter. A compensator compensates the channel signals with the channel estimation signal.

32 Claims, 11 Drawing Sheets

⁂2 : MEANS TWO LINES

⁂2 : MEANS TWO LINES

DEVICE AND METHOD FOR MOBILE STATION FOR RECEIVING SIGNALS TRANSMITTED FROM A BASE STATION

BACKGROUND OF THE INVENTION

1. Field of the Invention

The present invention relates generally to mobile communication systems, and in particular, to a device and method for a mobile station for receiving signals transmitted from a base station having a transmission diversity function.

2. Description of the Related Art

In a typical mobile communication system, a base station and a mobile station each have one antenna to exchange data with each other. In such a design configuration, when a transmission channel fades, as when an obstacle, such as a building, is between the mobile station and the base station, the communication quality deteriorates. To counteract this from occurring, a diversity technique is generally used. The diversity technique improves the performance of the mobile communication system.

To transmit signals from a mobile station to a base station via a reverse link, a receiver diversity technique can be used in which multiple receiving antennas are installed at the base station. In addition, for transmitting signals from the base station to the mobile station via a forward link, it is possible to use a transmission diversity technique for transmitting the signals via multiple transmission antennas installed at the base station. Where the base station has a transmission diversity function, the mobile station can use only one antenna for diversity effect.

In practice, however, it is difficult to install multiple receiving antennas in the small mobile station to configure the mobile station to optimally perform using the receiver diversity technique during forward link communications. Even though receiving antennas can be installed in the mobile station, the small size of the mobile station limits the distance between the receiving antennas, and thereby, reducing a diversity gain. In addition, when multiple antennas are installed in the mobile station, it is necessary to provide separate schemes for receiving forward link signals and transmitting reverse link signals via the corresponding antennas, causing an increase in size and cost of the mobile station. For these reasons, the mobile communication system generally uses transmission diversity techniques rather than the receiver diversity techniques.

SUMMARY OF THE INVENTION

It is, therefore, an object of the present invention to provide a receiving device and method for a mobile station for receiving signals transmitted from a base station having a time-switched transmission diversity (TSTD) function.

It is another object of the present invention to provide a receiving device and method for a mobile station for receiving signals transmitted from a base station via multiple transmission antennas by using a single receiving antenna.

It is further another object of the present invention to provide a device and method for a mobile station for receiving a TSTD signal and a non-TSTD signal transmitted from a base station and estimating channel conditions for the respective paths according to operation modes.

It is still another object of the present invention to provide a device and method for a mobile station for estimating a receiving power of signals transmitted from a base station having a TSTD function.

It is still further another object of the present invention to provide a device and method for a mobile station for estimating a receiving power of a TSTD signal and a non-TSTD signal transmitted from a base station having a TSTD function.

These and other objects are realized by the present invention where a device and methods are provided for a mobile station for receiving and processing data transmitted in a time-switched transmission diversity (TSTD) function from a base station.

In accordance with one aspect of the present invention, a receiving device for a mobile communication system includes a despreader for despreading channel signals which have been transmitted in a time-switched transmission diversity (TSTD) mode of operation; a pilot separator for separating a pilot signal from the despread channel signals; a channel estimator for generating a channel estimation signal by selecting pilot signals transmitted from a same antenna of a transmitter according to a TSTD pattern of the transmitter; and a compensator for compensating the channel signals with the channel estimation signal.

In accordance with another aspect of the present invention, a receiving device for a mobile communication system includes a despreader for despreading channel signals which have been transmitted in a TSTD mode of operation; a pilot separator for separation a pilot signal from the despread channel signals; a signal power estimator for generating a signal power estimation signal by selecting pilot signals transmitted from a same antenna of a transmitter according to a TSTD pattern of the transmitter; an interference power estimator for generating an interference power estimation signal from the channel signals transmitted in the TSTD mode of operation; and a decider for deciding power of a received signal by operating the signal power estimation signal and the interference power estimation signal.

DETAILED DESCRIPTION OF PREFERRED EMBODIMENTS

Preferred embodiments of the present invention will be described herein below with reference to the accompanying drawings. In the following description, well known constructions or functions are not described in detail so as not to obscure the present invention.

The term "interpolation" as used herein refers to an operation of estimating values at several time slots in a predetermined time interval using plural values determined during the predetermined time interval.

The receiving device and methods for a mobile station according to the present invention receive and process data transmitted in a time-switched transmission diversity (TSTD) function from a base station. Herein, the present invention will be described with reference to a channel which transmits information from the base station. However, it is contemplated that when a transmission device for a mobile communication system transmits signals on a common channel and/or a dedicated channel in a TSTD mode of operation, a receiving device at the base station of the mobile communication system can receive the TSTD signal transmitted in the TSTD mode of operation according to the embodiments of the present invention.

Figure 1:
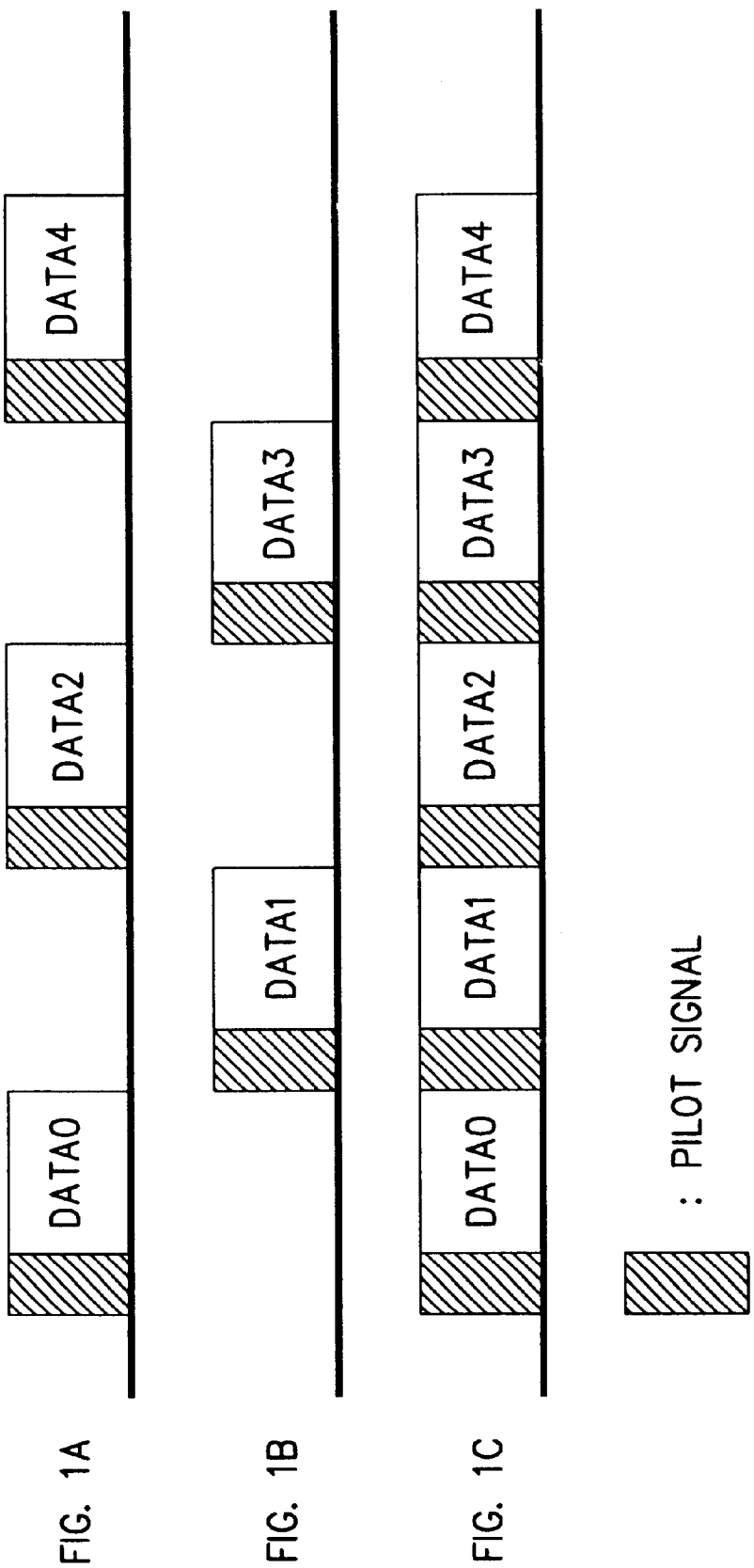
FIGS. 1A through 1C are diagrams illustrating various formats of data transmitted from a base station.

FIGS. 1A through 1C illustrate various formats of data output from a transmitter of a base station. Herein, it is assumed that the base station with the TSTD function has two antennas ANT1 and ANT2. More specifically, FIG. 1A illustrates a format of data output from the transmission antenna ANT1 of the base station; FIG. 1B a format of data output from the transmission antenna ANT2 of the base station; and FIG. 1C a format of data output from a base station not using the TSTD function, i.e., a non-TSTD base station. As used herein, the word "data" includes not only actual data, such as packet data, but also all kinds of information which is transmitted in the mobile communication system.

With continued reference to FIGS. 1A through 1C, the TSTD function featured in the data is transmitted by alternating the transmission antennas. For example, where data is transmitted using multiple antennas as shown in FIGS. 1A and 1B, even though a mobile station has a low receiving probability of a signal (or data) because of a bad channel condition for a signal transmitted from one antenna, a next signal may be transmitted via another normal channel using the other antenna, thereby preventing a decrease in the receiving probability. Therefore, the consecutively received data may be less susceptible to the channel condition.

Multiple antennas are generally used to transmit data using the TSTD function. For simplicity, however, it is assumed herein that the base station transmits data using two transmission antennas in a TSTD mode of operation. In addition, it is assumed that even-numbered data groups are transmitted using a first antenna ANT1 as shown in FIG. 1A and odd-numbered data groups are transmitted using a second antenna ANT2 as shown in FIG. 1B.

As illustrated in FIGS. 1A and 1B, while the first antenna ANT1 transmits the even-numbered data group, the second antenna ANT2 does not transmit data. After the first antenna ANT1 completes transmission of the even-numbered data group, the second antenna ANT2 transmits the odd-numbered data group at which time the first antenna ANT1 does not transmit data. Such a data transmission technique is called a TSTD function. In a TSTD mode of operation, data is generally transmitted by switching two or more antennas. Although the present invention will be described with reference to an embodiment in which the transmitter transmits data using two antennas by sequential time switching, it is also possible for the transmitter to have three or more antennas for performing the TSTD method of transmitting data by using a TSTD pattern predetermined between the base station and the mobile station, rather than sequential time switching.

FIG. 1C illustrates a format of data transmitted from a base station using a single antenna, without using the TSTD function. As illustrated, all the data groups are transmitted through one antenna.

Figure 2:
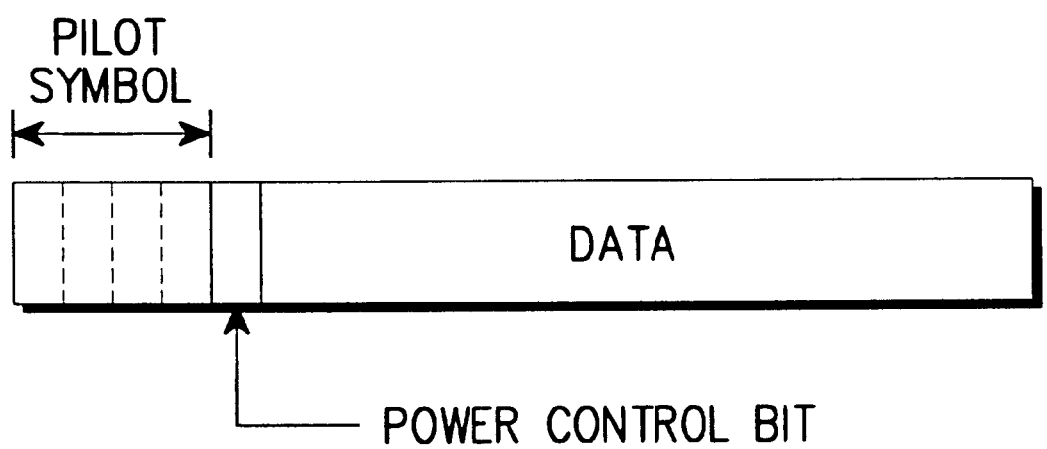
FIG. 2 is a diagram illustrating structure of a data group transmitted from a base station.

FIG. 2 illustrates structure of a data group transmitted from the base station having the TSTD function. As illustrated, each data group transmitted from the base station having the TSTD function is composed of pilot symbols, a power control bit (PCB) and data. The pilot symbols are used for channel estimation, power estimation and rapid acquisition. Information transmitted through the pilot symbols are known to both the base station and the mobile station. That is, the pilot symbols are transmitted as all "0"s or all "1"s. The power control bit transmitted from the base station controls a transmission power of the mobile station. The "data" refers to data bits (or data signals) transmitted from the base station. Herein, a block composed of the pilot symbols, the power control bit and the data is referred to as a "data block".

A. First Embodiment

Figure 3:
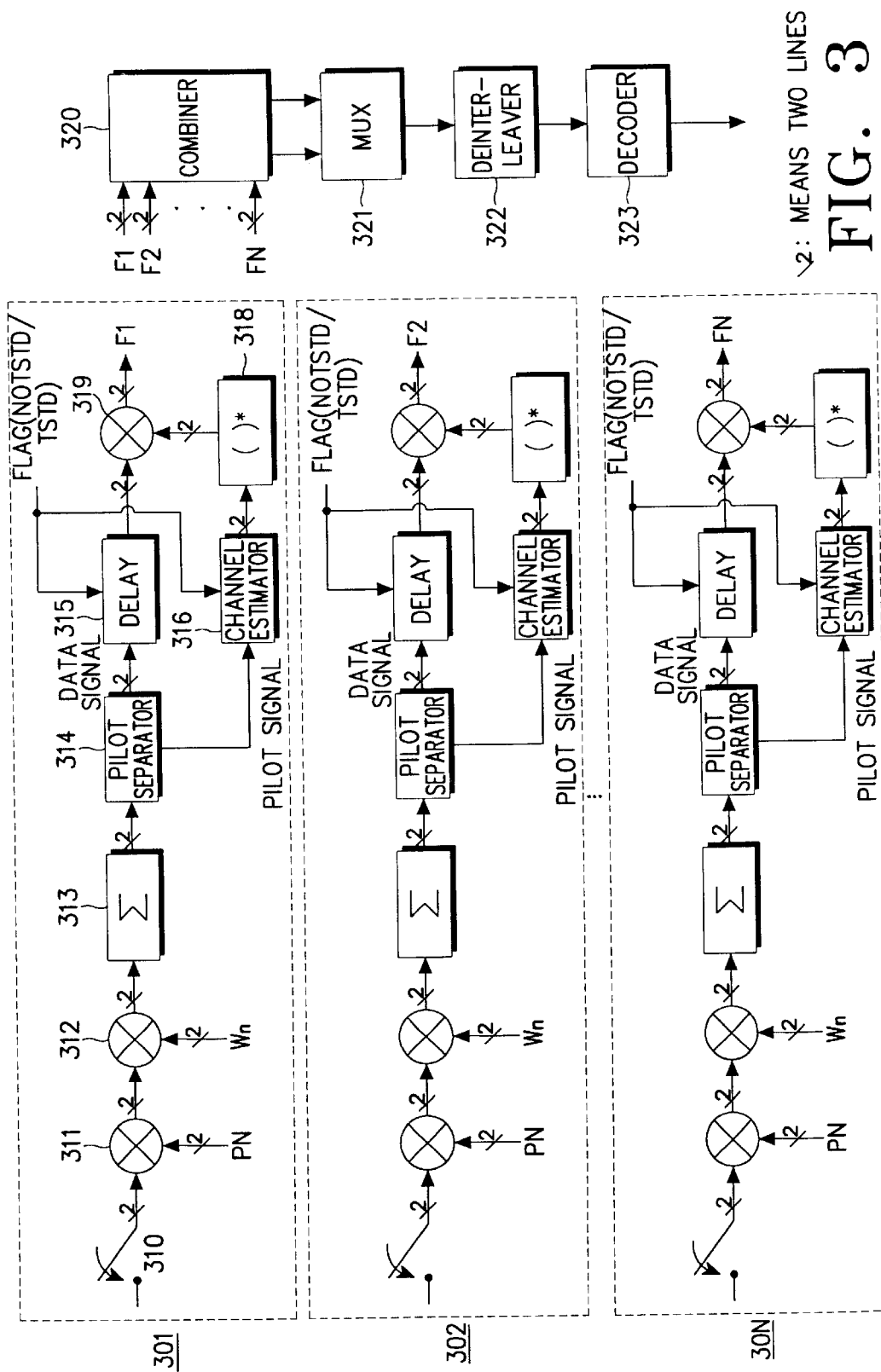
FIG. 3 is a diagram illustrating a receiver for a mobile station which receives data transmitted from a base station according to a first embodiment of the present invention.

FIG. 3 illustrates a receiver for a mobile station for receiving data transmitted from a base station supporting the TSTD function according to a first embodiment of the present invention. The receiver of FIG. 3 is designed to receive data transmitted in both the TSTD mode and a non-TSTD mode of operation. The receiver for the mobile station includes N fingers 301–30N. For convenience, a description will be made focusing on only one finger. In addition, although each finger processes signals by dividing them into I-channel signals and Q-channel signals, a description is made herein to a process of receiving signals without dividing the signals according to the channels, for simplicity purposes. Each finger has two paths for the I-channel signals and the Q-channel signals.

Referring to FIG. 3, a switch 310 samples a signal output from a demodulator (not shown) in a preceding stage of the finger 301. A PN (Pseudo Noise) despreader 311 multiplies the sampled signal by a PN sequence to despread the sampled signal. A complex PN despreader can be used for the PN spreader 311. An orthogonal despreader 312 multiplies signals output from the PN despreader 311 by an orthogonal code in order to extract a signal for the corresponding finger from the output signals of the PN despreader 311. Here, a Walsh code can be used for the orthogonal code. A sum and dump block 313 sums and dumps (or accumulates) signals output from the orthogonal despreader 312.

A pilot separator 314 separates pilot signals and data signals from the signals output from the sum and dump block 313. A channel estimator 316 receives the pilot signals separated by the pilot separator 314 and is set to the TSTD mode or the non-TSTD mode of operation according a TSTD flag signal output from a controller (not shown). The channel estimator 316 analyzes the pilot signals output from the pilot separator 314 according to the set operation mode to estimate the channel. A conjugator 318 conjugates an output of the channel estimator 316.

A delay 315 receives the data signals output from the pilot separator 314 and is set to the TSTD mode or the non-TSTD mode of operation according the TSTD flag signal output from the controller. The delay 315 delays data by one data group in the non-TSTD mode of operation and by data groups corresponding to the number of used antennas in the TSTD mode of operation. A multiplier 319 multiplies the data signals output from the delay 315 by a conjugated channel estimation signal output from the conjugator 318 to generate an output signal of the corresponding finger 301. The delay 315 and the multiplier 319 constitute a channel compensator.

A combiner 320 combines outputs F1–FN of the respective fingers 301–30N. A multiplexer 321 multiplexes two-channel signals of the I-channel signal and the Q-channel signal output from the combiner 320 into one-channel signals (i.e., one bit stream). A deinterleaver 322 deinterleaves an output of the multiplexer 321 in order to convert the signals interleaved at the base station into the original arrangement. A decoder 323 decodes an output of the deinterleaver 322 in order to convert the data encoded at the transmitter into the original data.

Figure 4:
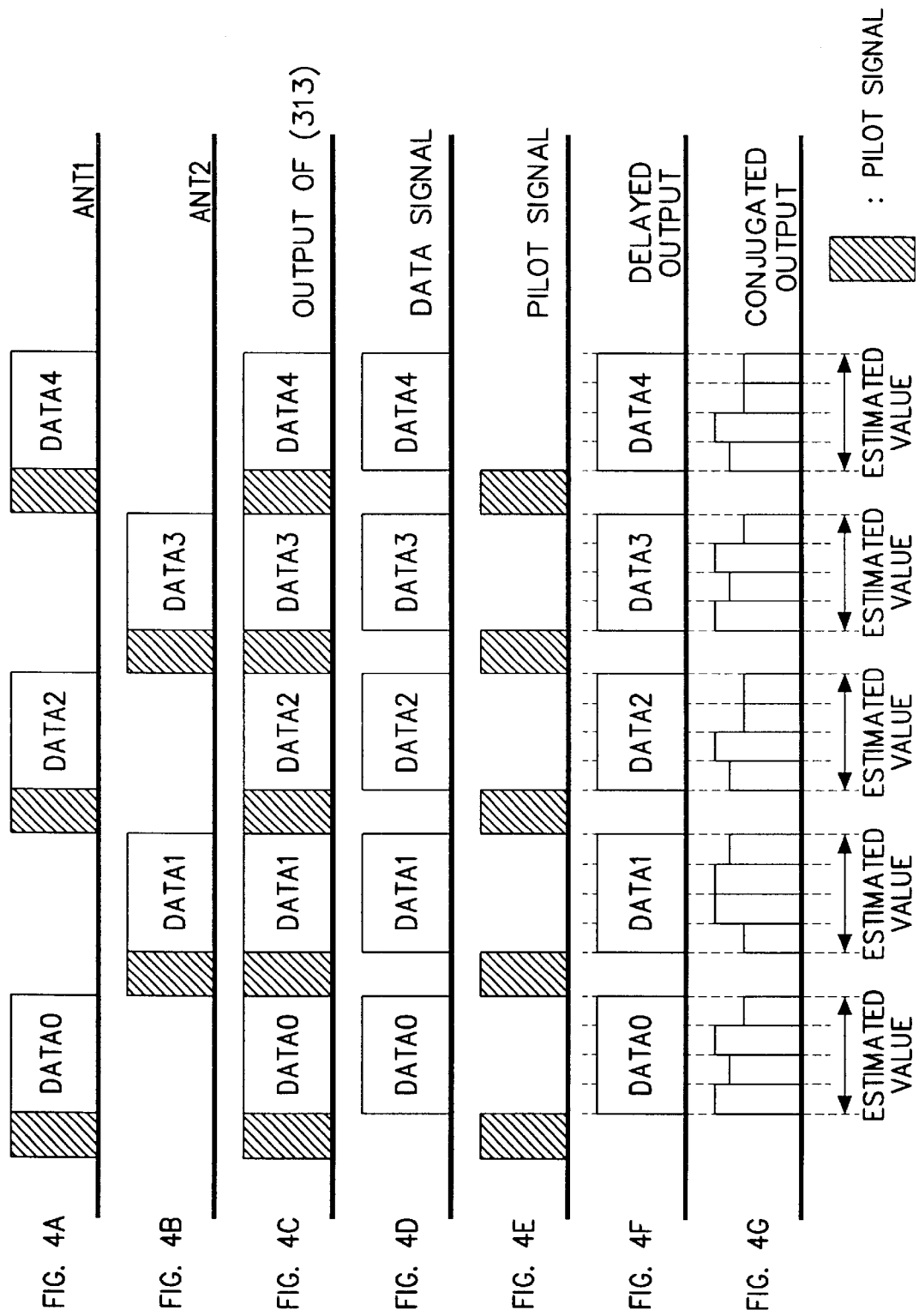
FIGS. 4A through 4G are diagrams illustrating formats of data occurring at respective elements of the receiver of FIG. 3.

FIGS. 4A through 4G illustrate formats of data occurring at the respective elements in the receiver of FIG. 3; the data being transmitted from the base station in the TSTD mode of operation. More specifically, FIGS. 4A and 4B show data transmitted from the same transmitter by alternating the antennas ANT1 and ANT2. As stated above, when the antenna ANT1 transmits data, the antenna ANT2 does not transmit data, and vice versa.

FIG. 4C shows a format of data output from sum and dump block 313. As illustrated, the data received at the receiver includes not only data for the user of the receiver but also data for other users. By correlating the data received at the receiver with a specific PN code and a specific Walsh code, data for other users are removed and only the data for the user of the receiver remains. In FIG. 4A, the even-numbered data groups (or blocks) DATA0, DATA2, DATA4, . . . are transmitted from the transmitter using the antenna ANT1. In FIG. 4B, the odd-numbered data blocks DATA1, DATA3, . . . are transmitted from the transmitter using the antenna ANT2. Although the transmitter transmits data using different antennas, the receiver receives the data using one antenna so that the received data may have the format of FIG. 4C.

FIGS. 4D and 4E show formats of data output from the pilot separator 314. More specifically, FIG. 4D shows a format of data input to the delay 315 and FIG. 4E a format of data input to the channel estimator 316. In addition, FIGS. 4F and 4G shows formats of data input to the multiplier 319. More specifically, FIG. 4F shows a format of data output from the delay 315 and FIG. 4G a format of data output from the conjugator 318. The data of FIG. 4F is multiplied in the multiplier 319 by the data of FIG. 4G and the multiplier 319 outputs a channel distortion-compensated value. Here, the channel distortion occurs while the transmission data passes the channel.

Referring to FIGS. 4A through 4G, a description will now be made as to the operation of the receiver for the mobile station of FIG. 3. The PN despreader 311 includes a PN code generator and PN despreads the received signal. The orthogonal despreader 312 includes a Walsh code generator and orthogonally despreads the PN despread signal. The PN despreader 311, the orthogonal despreader 312 and the sum and dump block 313 constitute a correlator. The despreaders 311 and 312 multiply the mixed signals for the multiple users by the PN code and the Walsh code used, at the transmitter, for the user of the receiver. The sum and dump block 313 sums and dumps the signals multiplied by the PN code and the Walsh code at the despreaders 311 and 312 for a predetermined duration. In the process of the sum and dump, the signals for the other users are removed and only the signal for the intended user remains.

Therefore, the correlator sequentially receives the signals transmitted from the antennas ANT1 and ANT2 of the transmitter and outputs the signals of FIG. 4C by PN despreading, orthogonal despreading, and summing and dumping. The signal output from the correlator is provided to the pilot separator 314. The pilot separator 314 separates the pilot signals and the data signals from the output signals of the correlator and provides the pilot signals to the channel estimator 316 and the data signals to the delay 315.

Figure 5:
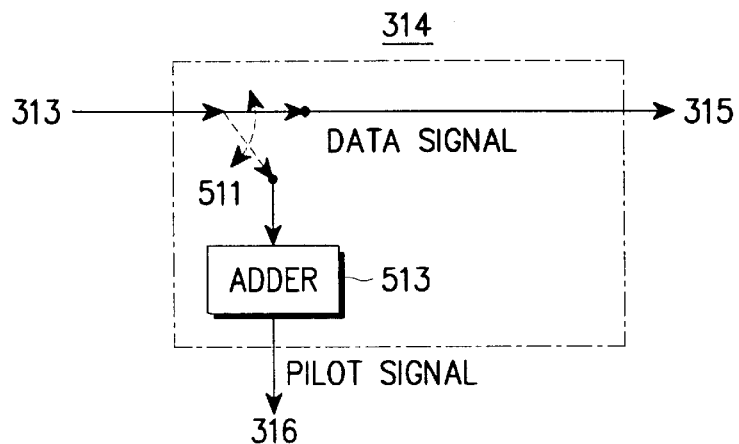
FIG. 5 is a diagram illustrating a pilot separator of FIG. 3.

Referring to FIG. 5, there is shown the pilot separator 314 which separates the pilot symbols arranged in the leading portion of each data block of FIG. 4C, which is output from the sum and dump block 313. In the figure, a switch 511 separates the pilot signals of FIG. 4E from the received signals of FIG. 4C and provides the separated pilot signals to a summer 513, which sums and dumps the pilot signals output from the switch 511.

In the meantime, upon receipt of the data signals of FIG. 4D after completion of separating the pilot signals of FIG. 4E, the switch 511 is connected to the delay 315 to separate the data signals of FIG. 4D from the pilot signals. In this manner, the summer 513 sums and dumps the pilot signals separated from the data block having the structure of FIG. 2 and provides its output to the channel estimator 316. Furthermore, the switch 511 provides the separated data signals following the pilot signals to the delay 315.

The delay 315 then delays the data signals separated by the pilot separator 314 according to a TSTD flag signal. That is, the delay 315 delays the data signals by one data group when the TSTD flag signal designates the non-TSTD mode. Alternatively, the delay 315 delays the data signals by data blocks corresponding to the number of the antennas used for the transmitter when the TSTD flag signal designates the TSTD mode. The delay 315 can be constructed as shown in FIG. 6.

Figure 6:
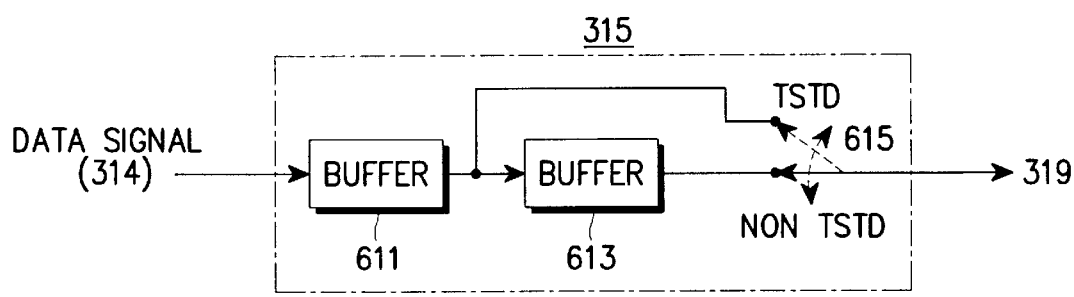
FIG. 6 is a diagram illustrating a delay of FIG. 3.

Referring to FIG. 6, the delay 315 is provided with the TSTD flag signal from the controller. When the TSTD function is not used (FLAG=NOTSTD), a switch 615 is connected to an output of a buffer 611. Alternatively, when the TSTD function is used (FLAG=TSTD), the switch 615 is connected to an output of a buffer 613. The buffers 611 and 613 each can store one data block and delay the data stored therein until the next data block is received. Upon receipt of the next data block, the buffers 611 and 613 output all the data stored therein in an instant. That is, until the next data block is received, the present data blocks are stored in the corresponding buffers.

In this manner, the received data signals are delayed by one data block when the TSTD function is not used (FLAG= NOTSTD). However, when the TSTD function is used (FLAG=TSTD), the received data signals are delayed by two data blocks. That is, while the channel estimator 316 estimates the channel, the delay 315 delays the data signals of FIG. 4D separated by the pilot separator 315 and outputs the delayed data signal of FIG. 4F.

The channel estimator 316 of FIG. 3 receives the pilot signals of FIG. 4E, output from the pilot separator 314.

When the TSTD flag designates the non-TSTD function (FLAG=NOTSTD), the channel estimator 316 estimates a condition of only one channel. However, when the TSTD flag designates the TSTD function (FLAG=TSTD), the channel estimator 316 estimates the channels as many as the number of the transmission antennas. The channel estimator 316 may have the structure of FIG. 7 or 8. Further, the conjugator 318 conjugates the output of the channel estimator 316. The conjugation generally means an operation of converting signs of only an imaginary part of a complex number. That is, when the imaginary part of the complex output of the channel estimator 316 is a positive number, the conjugator 318 changes the sign of only the imaginary part to a negative number. Alternatively, when the imaginary part is the negative number, the conjugator 318 changes the sign of only the imaginary part to the positive number.

The multiplier 319 then multiplies the data signal output from the delay 315 by a channel estimation signal output from the conjugator 318, to thereby compensate for the channel distortion occurring while the data signal passes the channel. The above described elements 311–319 constitute the receiver for one path. FIG. 3 illustrates receivers for N paths, on the assumption that the signals are received via N paths.

The combiner 320 combines the signals received through the respective paths. As stated above, inputs to and outputs from the elements 311–319 are complex signals. Therefore, an output of the combiner 320 is also a complex signal, so that the output of the combiner 320 can be divided into a real part and an imaginary part. The multiplexer 321 then multiplexes the real signal and the imaginary signal output from the combiner 320 to convert them into one data flow. The deinterleaver 322 deinterleaves an output of the multiplexer 321 to rearrange the sequence of the data bits, which have been interleaved at the transmitter for overcoming a burst error, into the original sequence. The decoder 323 decodes an output of the deinterleaver 322 to restore the decoded signals using the error correction code, which has been used at the transmitter for overcoming an error occurring during transmission.

Figure 7:
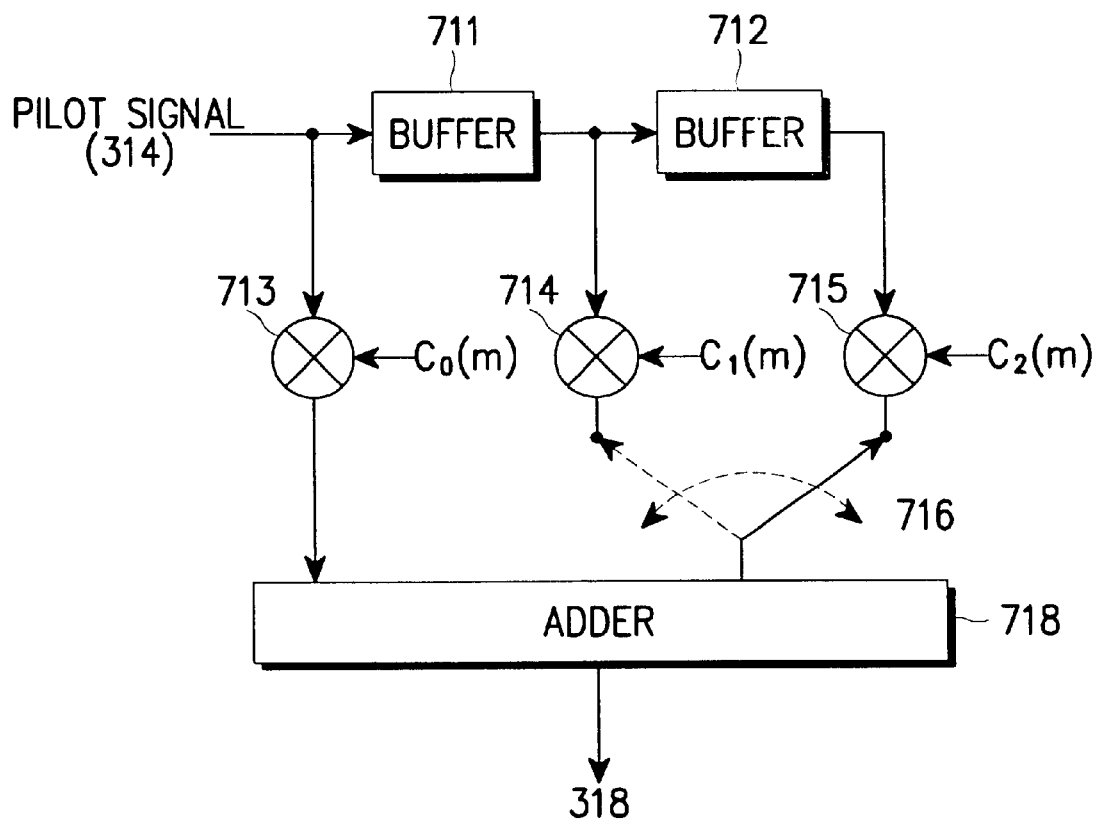
FIG. 7 is a diagram illustrating a channel estimator of FIG. 3 according to a first embodiment.

FIG. 7 illustrates the channel estimator 316 of FIG. 3, according to a first embodiment, in the case where the TSTD function is implemented using two antennas. The channel estimator 316 receives the pilot signals of FIG. 4E, which were separated and summed by the pilot separator 314. Also, the channel estimator 316 is provided with the TSTD flag signal output from the undepicted controller. When the TSTD function is not used (FLAG=NOTSTD), a switch 716 in the channel estimator 316 is connected to a multiplier 714. However, when the TSTD function is used (FLAG=TSTD), the switch 716 is connected to a multiplier 715. Buffers 711 and 712 each store the summed and dumped values for the pilot signals included in one data block and delay them until the summed and dumped values for the pilot signals included in the next data block are received.

When the TSTD function is not used (FLAG=NOTSTD), the signals transmitted from the transmitter have the format of FIG. 1C and the switch 716 is connected to the multiplier 714. Therefore, when the pilot signals for the presently received data block are summed and dumped, this value is linearly combined with the summed and dumped values for the pilot signals in the previously received data block to estimate the channel distortion generated while the previously received data stored in the delay 315 passes the channel. As a result, when the signals are transmitted without using the TSTD function, the channel estimator 316 delays the received pilot signals by one data block.

In addition, a multiplier 713 multiplies the summed and dumped values for the pilot signals in the presently received data block by a first coefficient sequence $C_0(m)$, and the multiplier 714 multiplies the summed and dumped values for the pilot signals for the previously received data block by a second coefficient sequence $C_1(m)$. An adder 718 adds output values of the multipliers 713 and 714. Accordingly, when the TSTD function is not used, an output value of the adder 718 becomes a channel distortion-estimated value for the data included in the previous data block.

However, when the transmitter transmits signals using the TSTD function (FLAG=TSTD), the transmitted signals have the formats of FIGS. 4A and 4B. Here, as stated above, the transmitter uses two transmission antennas to implement the TSTD function. Although the data blocks are transmitted in the forms of FIGS. 4A and 4B, the correlator in the receiver having one antenna receives the data blocks in the form of FIG. 4C and despreads the received data to extract the channel data for the corresponding user.

In FIG. 4C, since the even-numbered data blocks DATA0, DATA2 and DATA4 and the odd-numbered data blocks DATA1 and DATA3 are transmitted using two different antennas, respectively, channel estimation should be separately performed for the even-numbered data blocks and the odd-numbered data blocks. That is, channel estimation for the even-numbered data blocks should be performed using the pilot signals in the even-numbered data blocks. So, the received pilot signals should be delayed using the two buffers 711 and 712 until the pilot signals in the next even-numbered data block are received for channel estimation. The switch 716 is then connected to the multiplier 715.

As the switch 716 is connected to the multiplier 715, the multiplier 713 multiplies the summed and dumped values for the pilot signals in the presently received data block by the first coefficient sequence $C_0(m)$ and the multiplier 715 multiplies the summed and dumped values for the pilot signals in the previously received data block by a third coefficient $C_2(m)$. That is, if the presently received data block is a even-numbered data block, the summed and dumped values for the pilot signals in the presently received data block and the previously received even-numbered data block are multiplied by the first and third coefficient sequences $C_0(m)$ and $C_2(m)$, respectively. Alternatively, if the presently received data block is an odd-numbered data block, the summed and dumped values for the pilot signals in the presently received data block and the previously received odd-numbered data block are multiplied by the first and third coefficient sequences $C_0(m)$ and $C_2(m)$, respectively.

The adder 718 adds outputs of the multipliers 713 and 715, and the output of the adder 718 becomes the channel distortion-estimated values for the data included in the previous even-numbered or odd-numbered data block. The first, second and third coefficient sequences $C_0(m)$, $C_1(m)$ and $C_2(m)$ for the multipliers 713, 714 and 715, respectively, are coefficient sequences used for estimating gap values, and determining the size (i.e., length) of the coefficient sequences depending on the number of data positions in the data block. Therefore, the channels can be estimated according to the positions of the data in the received data block. When the signals are transmitted using the TSTD function, the gap between two values for the summed and dumped pilot signals is different from the case where the TSTD function is not used. Therefore, the first, second and third coefficient sequences $C_0(m)$, $C_1(m)$ and $C_2(m)$ for the multipliers 713, 714 and 715, respectively, should be changed.

Figure 8:
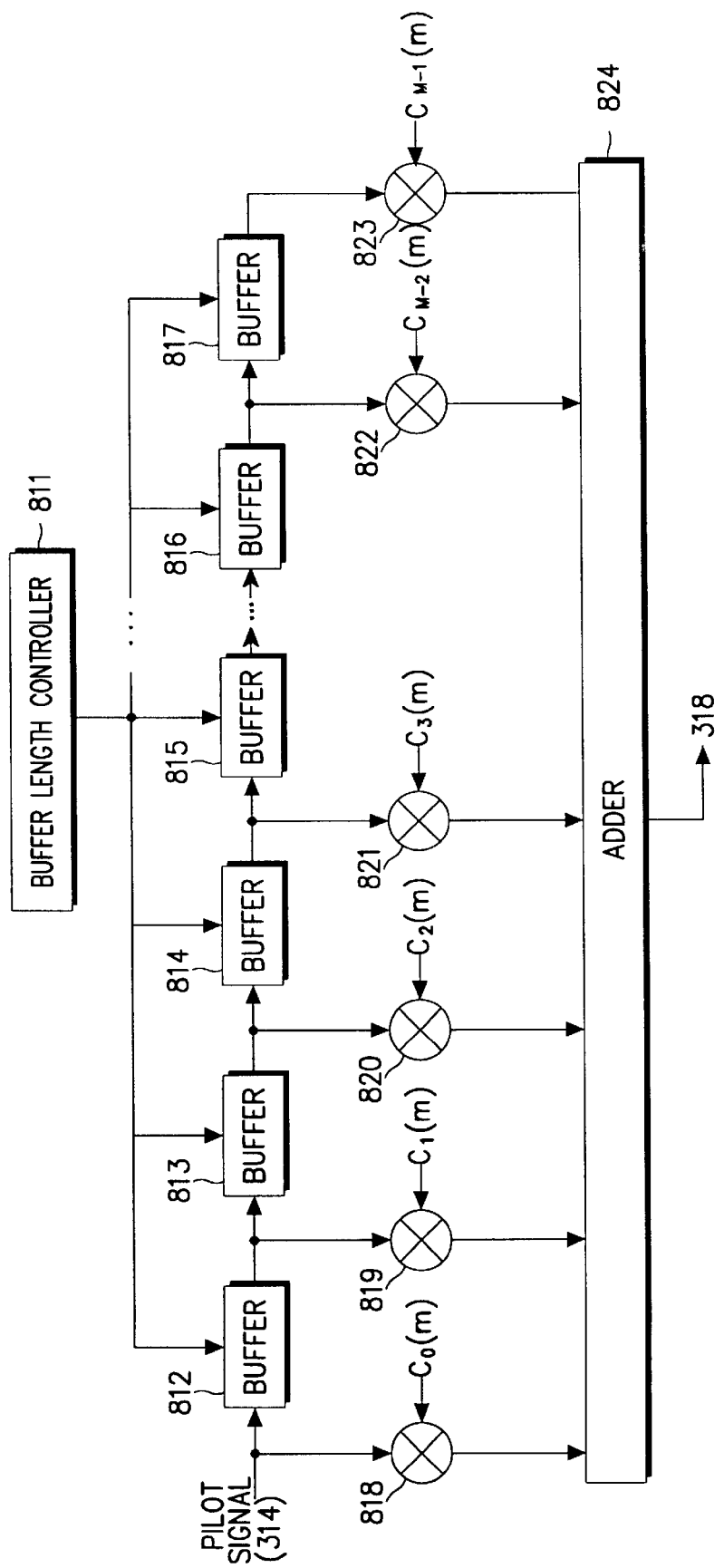
FIG. 8 is a diagram illustrating a channel estimator of FIG. 3 according to a second embodiment.

FIG. 8 illustrates the channel estimator 316 of FIG. 3 according to a second embodiment. As described above with reference to FIG. 7, channel estimation is performed for the respective data positions by performing a linear operation using two summed and dumped values for the pilot signals. However, in FIG. 8, channel estimation is performed for the respective data positions by performing a linear operation using M summed and dumped values for the pilot signals.

Though the channel estimation methods using the channel estimators described herein with reference to FIGS. 7 and 8 are theoretically identical to each other, they are implemented in different manners. In FIG. 7, the buffers 711 and 712 have the same buffer size and delay time. However, in FIG. 8, there is provided a buffer size (or length) controller 811 for controlling buffers 812–817. That is, when the channel estimator 316 receives the flag signal (FLAG= NOTSTD) representing that the TSTD function is not used, the buffer size controller 811 stores the summed and dumped values for the pilot signals in the present data block in the buffers 812–817, and outputs the stored values upon reception of the summed and dumped values for the pilot signals in the next data block to store the summed and dumped values of the pilot signals in the next data block in the buffers 812–817.

However, upon receipt of the flag signal (FLAG=TSTD) representing that the TSTD function is used, the buffer size controller 811 stores two values determined by summing and dumping the pilot signals in the buffer 812–817, and outputs a first input value out of the two values upon receipt of a summed and dumped value for the pilot signals in the next data block to store the summed and dumped values for the pilot signals in the newly received data block. In this manner, the channel estimator 316 can obtain the same result as that of FIG. 7 which uses the switch. In addition, the size of coefficient sequences for multipliers 818–823 depends on the number of the data positions in the data block. Moreover, as in the case of FIG. 7, the size of the coefficient sequences in the case where the TSTD function is not used should be different from that in the case where the TSTD function is used.

B. Second Embodiment

Figure 9:
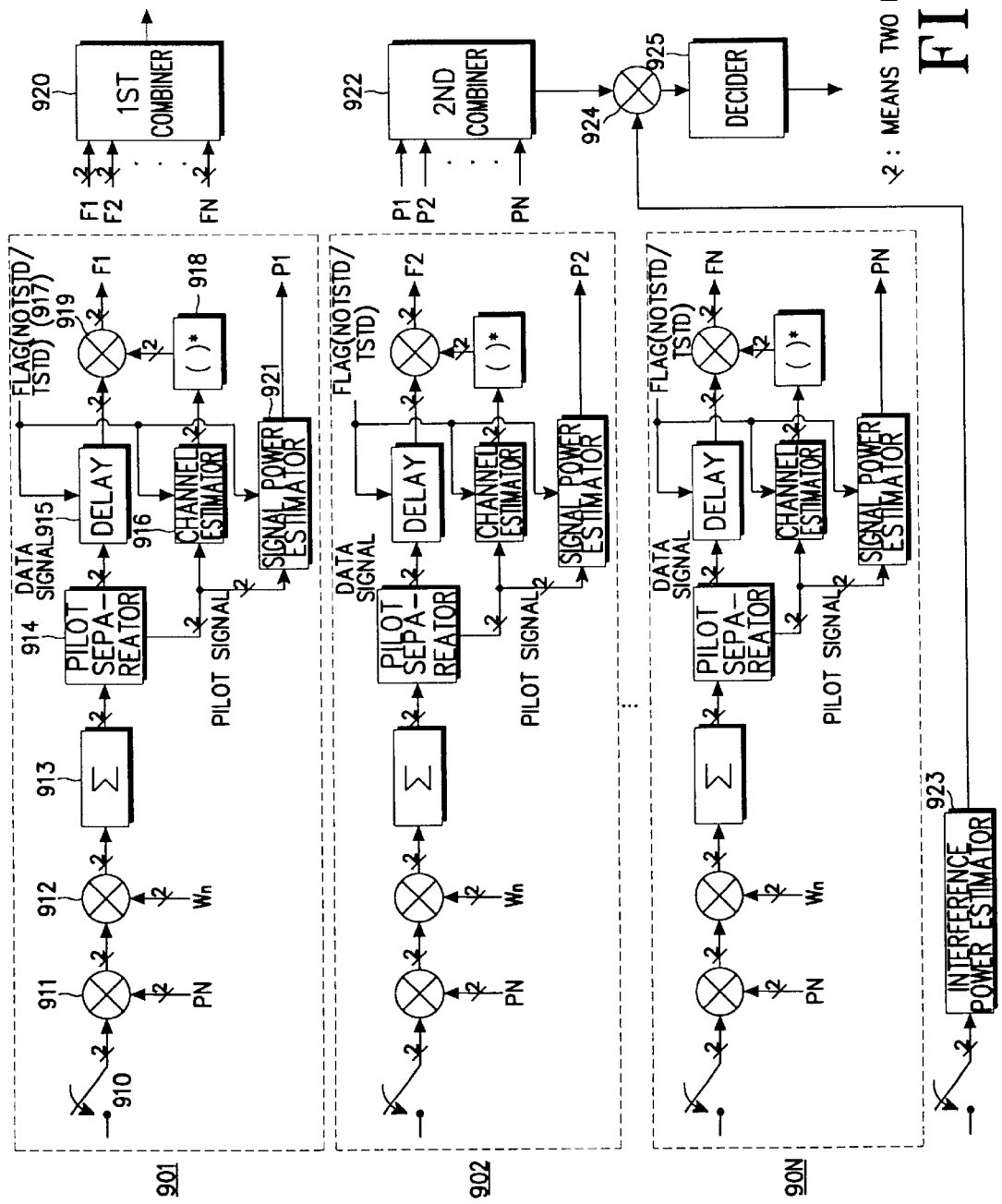
FIG. 9 is a diagram illustrating a receiver for a mobile station for receiving data transmitted from a base station according to a second embodiment of the present invention.

FIG. 9 illustrates a receiver for a mobile station for receiving data transmitted from a base station supporting the TSTD function according to a second embodiment of the present invention. The receiver of FIG. 9 is designed to receive data transmitted in both the TSTD mode and a non-TSTD mode of operation. The receiver for the mobile station includes N fingers 901–90N. For convenience, a description herein focuses on only one finger. In addition, although each finger processes signals by dividing them into I-channel signals and Q-channel signals, a description is made herein to a process of receiving signals without dividing the signals according to the channels, for simplicity purposes. Each finger has two paths for the I-channel signals and the Q-channel signals.

With continued reference to FIG. 9, a switch 910 samples a signal output from a demodulator (not shown) placed in a preceding stage of the finger 901. A PN (Pseudo Noise) despreader 911 multiplies the sampled signal by a PN sequence to despread the sampled signal. A complex PN despreader can be used for the PN spreader 911. An orthogonal despreader 912 multiplies signals output from the PN despreader 911 by a corresponding orthogonal code in order to extract a signal for the corresponding finger from the output signals of the PN despreader 911. Here, a Walsh code can be used for the orthogonal code. A sum and dump block 913 sums and dumps signals output from the orthogonal despreader 912.

A pilot separator 914 separates pilot signals and data signals from the signals output from the sum and dump block 913. A channel estimator 916 receives the pilot signals separated by the pilot separator 914 and is set to the TSTD mode or the non-TSTD mode of operation according a TSTD flag signal output from a controller (not shown). The channel estimator 916 analyzes the pilot signals output from the pilot separator 914 according to the set operation mode to estimate the channel. A conjugator 918 conjugates an output of the channel estimator 916.

A delay 915 receives the data signals output from the pilot separator 914 and is set to the TSTD mode or the non-TSTD mode of operation according the TSTD flag signal output from the controller. The delay 915 delays data by one data group in the non-TSTD mode of operation and by data groups corresponding to the number of the used antennas in the TSTD mode of operation. A multiplier 919 multiplies the data signals output from the delay 915 by a conjugated channel estimation signal output from the conjugator 918 to generate an output signal of the corresponding finger 901. The delay 915 and the multiplier 919 constitute a channel compensator.

A first combiner 920 combines channel compensation signals F1–FN output from the respective fingers 901–90N. A signal power estimator 921 receives the pilot signals separated by the pilot separator 914 and is set to the TSTD mode or the non-TSTD mode of operation according to the TSTD flag signal output from the undepicted controller. The signal power estimator 921 estimates power of the summed and dumped values for the pilot signals output from the pilot separator 914. A second combiner 922 combines power estimation signals P1–PN output from the signal power estimators in the respective fingers 901–90N.

An interference power estimator 923 estimates a receiving power of an interference signal. The reason that the receiver for the mobile station estimates the receiving power of the interference signal is to control a transmission power of the transmitter for the base station depending on the receiving power of a desired signal estimated by the signal power estimator 921 and a signal-to-interference ratio (SIR) estimated by the interference power estimator 923.

A multiplier 924 multiplies an output of the second combiner 922 by an output of the interference power estimator 923 which outputs a reciprocal of an interference power by estimating a power of the interference signal. The multiplier 924 provides its output to a decider 925, which compares the input SIR with a threshold value to output a power control command to be transmitted to the transmitter of the base station. The decider 925 transmits a power-up command to the base station when the SIR is lower than the threshold value, and transmits a power-down command to the base station when the SIR is higher than a threshold value.

The first combiner 920 combines the channel compensation signals F1–FN output from the multipliers 919 in the respective fingers 901–90N, and the second combiner 922 combines the signal powers P1–PN estimated by the signal power estimators 921 in the respective fingers 901–90N.

When the receiver of FIG. 9 receives data in the TSTD mode of operation, the formats of signals generated at the respective stages are the same as those described in the first embodiment with reference to FIGS. 4A to 4G.

The pilot separator 914 separates the pilot signals and the data signals from the data group and provides the separated pilot signals to the channel estimator 916 and the signal power estimator 921. Further, the pilot separator 914 provides the data signals to the delay 915. The pilot separator 914 has the same structure as in the first embodiment described with reference to FIG. 5. Also, operation of the pilot separator 914 is performed in the same manner as the first embodiment.

The delay 915 then delays the data signals separated by the pilot separator 914 according to a TSTD flag signal. That is, the delay 915 delays the data signals by one data group when the TSTD flag signal designates the non-TSTD mode. Alternatively, the delay 915 delays the data signals by data groups corresponding to the number of the antennas used for the transmitter when the TSTD flag signal designates the TSTD mode. The delay 915 can be constructed as shown in FIG. 6. Here, operation of the delay 915 is performed in the same manner as in the first embodiment.

The channel estimator 916 of FIG. 9 receives the pilot signals of FIG. 4E, output from the pilot separator 914. When the TSTD flag designates the non-TSTD function (FLAG=NOTSTD), the channel estimator 916 estimates a condition of only one channel. However, when the TSTD flag designates the TSTD function (FLAG=TSTD), the channel estimator 916 estimates the channels as many as the number of the transmission antennas. The channel estimator 916 may have the same structure as that of FIG. 7. The channel estimator 916 of FIG. 7 is implemented on the assumption that the TSTD function is performed using two antennas. Further, the channel estimator 916 operates in the same manner as in the first embodiment.

In addition, the receiving device for the mobile station estimates the channel distortion to compensate for the estimated channel distortion and also estimates the receiving power of the mobile station using the pilot signals. A description will now be made as to an operation of estimating the receiving power of the mobile station.

Figure 10:
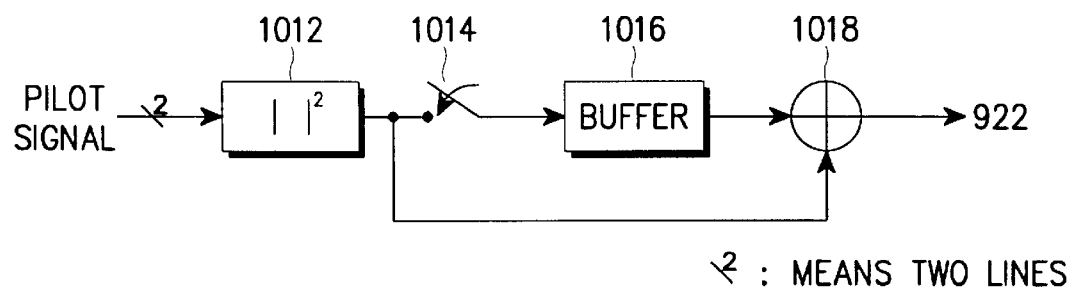
FIG. 10 is a diagram illustrating a signal power estimator of FIG. 9.

FIG. 10 illustrates the signal power estimator 921 of FIG. 9 which estimates power of a received signal. The signal power estimator 921 is set to the TSTD mode or non-TSTD mode of operation according to the TSTD flag signal output from the controller.

A power measurer 1012 receives the summed and dumped pilot signals output from the pilot separator 914, separately squares the real part and the imaginary part thereof, and adds them. A switch 1014 connected to the power measurer 1012 is turned ON and OFF according to the TSTD flag signal. That is, the switch 1014 is turned ON in the TSTD mode of operation to connect with an output of the power measurer 1012.

In addition, the switch 1014 can be turned ON or OFF in the non-TSTD mode of operation to connect or disconnect the output of the power measurer 1012 to/from a buffer 1016. The buffer 1016 stores a power estimation output from the switch 1014 and delays the stored power estimation value until the pilot signals for the next data block are received. The buffer 1016 can store the summed and dumped values for the pilot signals in one data block and delays the stored value until the summed and dumped value for the pilot signals in the next data block is received. An adder 1018 adds an output of the power measurer 1012 to an output of the buffer 1016 to output a signal power for the corresponding finger.

A description will now be made as to an operation of the signal power estimator 921 with reference to FIG. 10. Signals input to the signal power estimator 921 are the summed and dumped values for the pilot signals separated by the pilot separator 914. Further, the summed and dumped values include a summed and dumped value for the pilot signals transmitted via the I-channel and a summed and dumped value for the pilot signals transmitted via the Q-channel. The power measurer 1012 receives the summed and dumped values for the pilot signals transmitted via both the I-channel and Q-channel. The power measurer 1012 separately squares the summed and dumped value for the pilot signals transmitted via the I-channel and the summed and dumped value for the pilot signals transmitted via the Q-channel, and then adds them.

The switch 1014 enables the signal power estimator 921 to operate in the TSTD mode or the non-TSTD mode according to the TSTD flag signal from the controller. When the signal power estimator 921 operates in the TSTD mode (FLAG=TSTD), the switch 1014 is turned ON to connect with the power measurer 1012. The adder 1018 then adds the output of the buffer 1016 which stores a receiving power estimation value for the previous data block with a receiving power estimation value for the present data block output from the power measurer 1012. Here, the output of the adder 1018 is a value obtained by adding the receiving powers estimated separately for the two data blocks. Therefore, the adder 1018 adds the receiving power estimation value for the previously received data block output from the buffer 1016 with the receiving power estimation value for the present data block output from the power measurer 1012 to generate a power estimation value for a signal transmitted in the TSTD mode of operation.

However, when the signal power estimator 921 does not operate in the TSTD mode (FLAG=NOTSTD), the switch 1014 can be turned ON or OFF. When the switch 1014 is turned OFF, the power measurer 1012 is disconnected from the buffer 1016. In this case, the adder 1018 is not provided with the power estimation value for the previous data block output from the buffer 1016. So, the adder 1018 outputs the power estimation value for the present data block, output from the power measurer 1012 as it is. Alternatively, when the switch 1014 is turned ON, the signal power estimator 921 operates in the same manner as the TSTD mode.

Accordingly, in the non-TSTD mode of operation, if the switch 1014 is turned ON, the signal power estimator 921 estimates the receiving power using the power of the received signals for two data blocks, which contributes to an accurate power estimation but causes a time delay. In addition, if the switch 1014 is turned OFF in the non-TSTD mode of operation, the signal power estimator 921 has a low accuracy of the power estimation but has a reduced time delay.

Figure 11A:
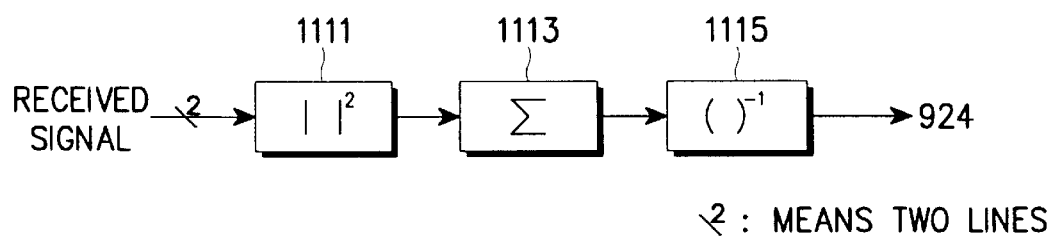
FIG. 11A is a diagram illustrating an interference power estimator of FIG. 9 according to a first embodiment.
Figure 11B:
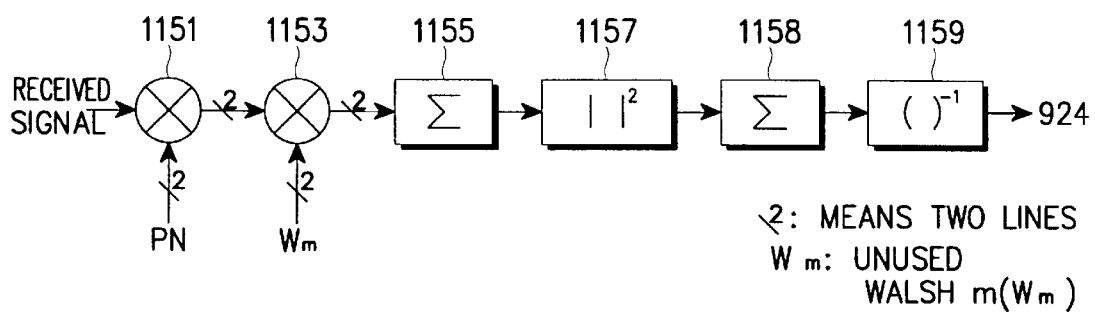
FIG. 11B is a diagram illustrating an interference power estimator of FIG. 9 according to a second embodiment.

FIGS. 11A and 11B illustrate the interference power estimator 923 according to a first and a second embodiment, respectively. In FIG. 11A, the interference power estimator 923 samples a signal output from demodulator (not shown) and directly estimates an interference power. In FIG. 11B, the interference power estimator 923 samples a signal output from demodulator, generates a particular interference signal using a PN code and a Walsh code, and then estimates the interference power.

Referring to FIG. 11A, a power measurer 1111 measures power of an interference signal for a received signal. A sum and dump block 1113 sums and dumps measured value for the interference power included in the received signal, output from the power measurer 1111, in the data block unit. A reciprocal block 1115 takes a reciprocal of the summed and dumped interference power.

A description will now be made as to an operation of the interference power estimator of the first embodiment with reference to FIG. 11A. The power measurer 1111 estimates power of the received signal. Signals input to the power measurer 1111 includes signals for the intended user, signals for other users, interference from other cells, and additive white Gaussian noise (AWGN). Here, since the signals input to the power measurer 1111 has not yet been despread using the PN code and the Walsh code for the intended user, the sum of the interference powers is much higher than the signal power for the intended user. Therefore, the signal for the intended user is negligible so that it can be considered as an interference signal with respect to the signal which is despread using the PN code and the Walsh code. Accordingly, the power measurer 1111 estimates power of the interference signal.

The sum and dump block 1113 then receives the output of the power measurer 1111 to sum and dump the power estimation value for a predetermined duration. The reciprocal block 1115 receiving the output of the sum and dump block 1113, takes a reciprocal of the interference power estimated by power measurer 1111 and the sum and dump block 1113. By multiplying the output of the reciprocal block 1115 by the output of the signal power estimator 921, the receiver can estimate the SIR so that it is possible to control a transmission power of the transmitter of the other party.

Referring to FIG. 11B, a PN despreader 1151 multiplies the received signal by a PN sequence to PN despread the received signal. An orthogonal despreader 1153 multiplies the PN despread signal by an orthogonal code. Here, a unused Walsh code Wm is used for the orthogonal code. A first sum and dump block 1155 sums and dumps a signal output from the orthogonal despreader 1153 in the symbol unit. A power measurer 1157 squares an output of the sum and dump block 1155 to measure the signal power. A second sum and dump block 1158 sums and dumps two or more values output from the power measurer 1157 to calculate a mean power value. A reciprocal block 1159 takes a reciprocal of the estimated signal power. Here, by using the second sum and dump block 1158, it is possible to estimate an accurate receiving power of the interference signal.

A description will now be made as to an operation of the interference power estimator 923. All the users in the same cell use the same PN code for despreading. However, the Walsh code Wm is used which is not used by anybody in the same cell. By despreading the received signal using the Walsh code Wm, it is possible to remove all the signals for the intended user and the other users by means of an orthogonality of the Walsh code. That is, by despreading the signal for the intended user neglected in FIG. 11A using the unused Walsh code Wm, it is possible to remove all the signals for the intended user as well as the other users by means of an orthogonality of the Walsh code. In this manner, the interference power estimator 923 can accurately estimate the interference power.

Figure 12:
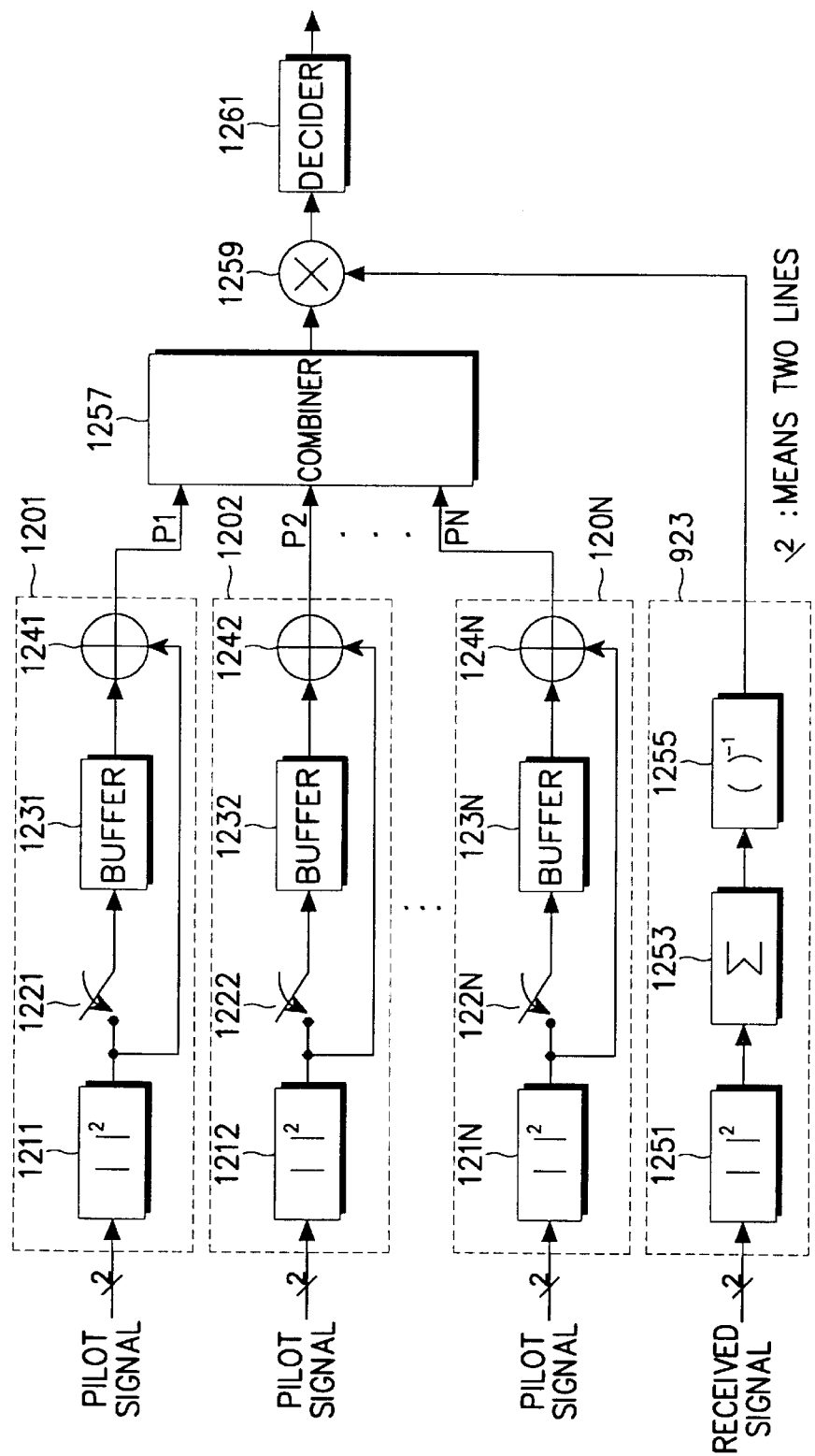
FIG. 12 is a diagram illustrating a device for estimating a receiving power of a received TSTD signal of the receiver of FIG. 9.

FIG. 12 is a diagram illustrating only the signal power estimator 921, the interference power estimator 923, the combiner 922 and the decider 925, which are interrelated for estimating the receiving power in the receiver of FIG. 9. The interference power estimator 923 has the structure shown in FIG. 11A or 11B. Herein, it is assumed that the interference power estimator 923 has the structure of FIG. 11A. For convenience of description, new reference numerals are used for the respective elements in FIG. 12.

Signal power estimators 1201–120N in N fingers of the receiver for the mobile station receive signals transmitted via N paths. Signals input to power measures 1211–121N in the respective signal power estimators 1201–120N are the summed and dumped values for the pilot signals output from the pilot separator 914. Signal input to a power measurer 1251 in the interference power estimator 923 are demodulated signals mixed of signals for the intended user, signals for other users and interference components.

The signal power estimators 1201–120N are set to TSTD mode or non-TSTD mode of operation according to the TSTD flag signal output from the controller. In the TSTD mode of operation, switches 1221–122N are turned ON. In the TSTD mode operation, the switches 1221–122N may be turned ON or OFF. Here, if the switches 1221–122N are turned ON, the power estimation value is calculated using two data blocks. In the TSTD mode of operation, the transmitter transmits signals via multiple antennas.

For example, assuming that the transmitter transmits the signals via two antennas, even-numbered data groups and odd-numbered data groups are transmitted via the different antennas, respectively. The receiver receiving the signals transmitted in the TSTD mode of operation, controls the transmission power by estimating a mean power of the two antennas. In this case, since the receiver should know estimated receiving powers for both the even-numbered data group and the odd-numbered data group, the switches 1221–122N are turned ON. Adders 1241–124N then add the signal power estimation values for the present data blocks output from the corresponding signal power estimators 1211–121N with the signal power estimation values for the previous data blocks output from buffers 1231–123N to generate signal power estimation values for the corresponding fingers. A combiner 1257 then combines the signal power estimation vales for N channels output from the adders 1241–124N.

As stated above, in the case where the transmitter transmits signals in the non-TSTD mode of operation, it is possible to calculate a more accurate power estimation value by closing (turning ON) the switches 1221–122N. However, the power estimation cannot be performed until the two data groups are received, thereby causing a power estimation delay. In the case where the transmitter transmits signals in the non-TSTD mode of operation, it is possible to prevent the power estimation delay by opening (turning OFF) the switches 1221–122N. In this case, however, an accuracy of the power estimation decreases.

In addition, a power measurer 1251, a sum and dump block 1253 and a reciprocal block 1255 in the interference power estimator 923 operate to estimate the receiving power of the interference signal. The elements 1251, 1253 and 1255 have the same functions as described with reference to FIG. 11A.

A multiplier 1259 multiplies an output of the combiner 1257, which combines the signal power estimation values for the respective paths output from the signal power estimators 1201–120N, by an output of the interference power estimator 923. Therefore, an output of the multiplier 1259 is an SIR (Signal-to-Inference Ratio) signal, which is provided to a decider 1261. The decider 1261 compares the SIR output from the multiplier 1259 with a threshold to transmit a power-up command to the transmitter of the other party when the SIR is lower than the threshold and to transmit a power-down command when the SIR is higher than the threshold.

As can be appreciated from the foregoing descriptions, in the case where the base station has multiple antennas transmitting data using the TSTD function on a time-division basis, the mobile station receives the transmitted data sequentially or in a predetermined pattern, despreads the received data and separates data and pilot signals from the despread data. The separated pilot signals are accumulated in a data group unit to estimate the channel and the receiving power, and the channel estimated value is multiplied by the delayed data signal to compensate for distortion included in the received data. Accordingly, the receiver and methods for the mobile station according to the present invention can efficiently estimate the TSTD signal and the receiving power. In addition, the receiver can receive both the signals transmitted in both the TSTD mode and the non-TSTD mode of operations by altering a method of buffering the received data and pilot signals according to the operation mode.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A receiving device for a mobile communication system, comprising:
   a despreader for despreading channel signals which have been transmitted in a time-switched transmission diversity (TSTD) mode of operation;
   a pilot separator for separating a pilot signal from the despread channel signals;
   a channel estimator for generating a channel estimation signal by selecting pilot signals transmitted from a same antenna of a transmitter according to a TSTD pattern of the transmitter, wherein the channel estimator comprises:
      at least two buffers for storing the pilot signals,
      a switch for selecting pilot signals transmitted from a same antenna that has transmitted a present pilot signal, by switching outputs of the buffers according to the TSTD pattern, and
      an operator for operating pilot signals transmitted from the same antenna to generate the channel estimation signal; and
   a compensator for compensating the despread channel signals with the channel estimation signal.

2. The receiving device as claimed in claim 1, wherein the pilot separator comprises:
   a switch for separating the pilot signal and a data signal from the despread channel signals; and
   a summer for summing and dumping the separated pilot signal.

3. The receiving device as claimed in claim 2, further comprising a delay for delaying the separated data signal to provide the data signal to the compensator in sync with the channel estimation signal.

4. The receiving device as claimed in claim 3, wherein the compensator comprises:
   a conjugator for conjugating the channel estimation signal; and
   a multiplier for multiplying the data signal by the conjugated channel estimation signal.

5. A receiving device for a mobile communication system, comprising:
   a despreader for despreading channel signals which have been transmitted in a TSTD mode of operation;
   a pilot separator for separating a pilot signal from the despread channel signals;
   a signal power estimator for generating a signal power estimation signal by selecting pilot signals transmitted from at least two antennas of a transmitter according to a TSTD pattern of the transmitter, wherein the signal power estimator comprises:
      a power measurer for measuring power of the pilot signal by operating the separated pilot signal,
      a selector for selecting a power value of a first pilot signal and a power value of a second pilot signal, measured according to the TSTD pattern, the second pilot signal being transmitted from an antenna other than the antenna that has transmitted the first pilot signal, and
      an operator for operating power values of the selected pilot signals transmitted from the same antenna to estimate the signal power;
   an interference power estimator for generating an interference power estimation signal from the channel signals transmitted in the TSTD mode of operation; and
   a decider for deciding power of a received signal by operating the signal power estimation signal and the interference power estimation signal.

6. The receiving device as claimed in claim 5, wherein the interference power estimator comprises:
   a power measurer for measuring power of a signal transmitted in the TSTD mode of operation;
   a summer for summing and dumping the estimated signal power in a data group unit; and
   a reciprocal element for generating the interference power estimation signal by taking a reciprocal of the summed and dumped signal power.

7. The receiving device as claimed in claim 5, wherein the interference power estimator comprises:
   a despreader for despreading the channel signals transmitted in the TSTD mode of operation using a specific spreading code;
   a power measurer for measuring power of the despread signal;
   a summer for summing and dumping the measured signal power in a data group unit; and
   a reciprocal element for generating the interference power estimation signal by taking a reciprocal of the summed and dumped signal power.

8. The receiving device as claimed in claim 5, wherein the pilot separator comprises:
   a switch for separating the pilot signal and a data signal from the despread channel signals; and
   a summer for summing the separated pilot signal.

9. A receiving device for a mobile communication system, comprising:
   a despreader for despreading channel signals which have been transmitted in a TSTD mode of operation;
   a pilot separator for separating a pilot signal from the despread channel signals;
   a channel estimator for generating a channel estimation signal by selecting pilot signals transmitted from a same antenna of a transmitter according to a TSTD pattern of the transmitter;
   a compensator for compensating the despread channel signals with the channel estimation signal;
   a signal power estimator for generating a signal power estimation signal by selecting pilot signals transmitted from at least two antennas of a transmitter according to the TSTD pattern of the transmitter, wherein the signal power estimator comprises:

a power measurer for measuring power of the pilot signal by operating the separated pilot signal, a selector for selecting a power value of a first pilot signal and a power value of a second pilot signal, measured according to the TSTD pattern, the second pilot signal being transmitted from an antenna other than the antenna that has transmitted the first pilot signal, and an operator for operating power values of the selected pilot signals transmitted from the same antenna to estimate the signal power;

an interference power estimator for generating an interference power estimation signal from the channel signals transmitted in the TSTD mode of operation; and a decider for deciding power of a received signal by operating the signal power estimation signal and the interference power estimation signal.

10. The receiving device as claimed in claim 9, wherein the channel estimator comprises:

at least two buffers for storing the pilot signals;

a switch for selecting pilot signals transmitted from a same antenna that has transmitted a present pilot signal, by switching outputs of the buffers according to the TSTD pattern; and an operator for operating the pilot signals transmitted from the same antenna to generate the channel estimation signal.

11. The receiving device as claimed in claim 10, wherein the pilot separator comprises:

a switch for separating the pilot signal and a data signal from the despread channel signals; and a summer for summing the separated pilot signal.

12. The receiving device as claimed in claim 11, further comprising a delay for delaying the separated data signal to provide the data signal to the compensator in sync with the channel estimation signal.

13. The receiving device as claimed in claim 12, wherein the compensator comprises:

a conjugator for conjugating the channel estimation signal; and a multiplier for multiplying the data signal by the conjugated channel estimation signal.

14. The receiving device as claimed in claim 9, wherein the interference power estimator comprises:

a power measurer for measuring power of a signal transmitted in the TSTD mode of operation;

a summer for summing and dumping the measured signal power in a data group unit; and a reciprocal element for generating the interference power estimation signal by taking a reciprocal of the summed and dumped signal power.

15. The receiving device as claimed in claim 9, wherein the interference power estimator comprises:

a despreader for despreading the channel signals transmitted in the TSTD mode of operation using a specific spreading code;

a power measurer for measuring power of the despread signal;

a summer for summing and dumping the measured signal power in a data group unit; and a reciprocal element for generating the interference power estimation signal by taking a reciprocal of the summed and dumped signal power.

16. The receiving device as claimed in claim 9, wherein the pilot separator comprises:

a switch for separating the pilot signal and a data signal from the despread channel signals; and a summer for summing the separated pilot signal.

17. A receiving method for a mobile communication system, comprising the steps of:

despreading channel signals which have been transmitted in a TSTD mode of operation;

separating a pilot signal from the despread channel signals;

generating a channel estimation signal by selecting pilot signals transmitted from a same antenna of a transmitter according to a TSTD pattern of the transmitter, wherein the channel estimation signal generating step comprises the steps of:

delaying the pilot signals, selecting pilot signals transmitted from a same antenna that has transmitted a present pilot signal, by switching outputs of a plurality of buffers according to the TSTD pattern, and operating pilot signals transmitted from the same antenna to generate the channel estimation signal; and compensating the despread channel signals with the channel estimation signal.

18. The receiving method as claimed in claim 17, wherein the pilot signal separating step comprises the steps of:

separating the pilot signal and a data signal from the despread channel signals; and summing and dumping the separated pilot signal.

19. The receiving method as claimed in claim 18, further comprising a step of delaying the separated data signal to synchronize the data signal with the channel estimation signal.

20. The receiving method as claimed in claim 19, wherein the compensation step comprises the steps of:

conjugating the channel estimation signal; and multiplying the data signal by the conjugated channel estimation signal.

21. A receiving method for a mobile communication system, comprising the steps of:

despreading channel signals which have been transmitted in a TSTD mode of operation;

separating a pilot signal from the despread channel signals;

generating a signal power estimation signal by selecting pilot signals transmitted from at least two antennas of a transmitter according to a TSTD pattern of the transmitter, comprising the steps of:

measuring power of the pilot signal by operating the separated pilot signal, selecting a power value of a first pilot signal and a power value of a second pilot signal, measured according to the TSTD pattern, the second pilot signal being transmitted from an antenna other than the antenna that has transmitted the first pilot signal, and operating power values of the selected pilot signals transmitted from the same antenna to estimate the signal power;

generating an interference power estimation signal from the channel signals transmitted in the TSTD mode of operation; and deciding power of a received signal by operating the signal power estimation signal and the interference power estimation signal.

22. The receiving method as claimed in claim 21, wherein the interference power estimating step comprises the steps of:

measuring power of a signal transmitted in the TSTD mode of operation;

summing and dumping the estimated signal power in a data group unit; and generating the interference power estimation signal by taking a reciprocal of the summed and dumped signal power.

23. The receiving method as claimed in claim 21, wherein the interference power estimation step comprises the steps of:

despreading the channel signals transmitted in the TSTD mode of operation using a specific spreading code;

measuring power of the despread signal;

summing and dumping the measured signal power in a data group unit; and generating the interference power estimation signal by taking a reciprocal of the summed and dumped signal power.

24. The receiving method as claimed in claim 21, wherein the pilot signal separating step comprises the steps of:

separating the pilot signal and a data signal from the despread channel signals; and summing and dumping the separated pilot signal.

25. A receiving method for a mobile communication system, comprising the steps of:

despreading channel signals which have been transmitted in a TSTD mode of operation;

separating a pilot signal from the despread channel signals;

generating a channel estimation signal by selecting pilot signals transmitted from a same antenna of a transmitter according to a TSTD pattern of the transmitter;

compensating the despread channel signals with the channel estimation signal;

generating a signal power estimation signal by selecting pilot signals transmitted from at least two antennas of a transmitter according to the TSTD pattern of the transmitter, wherein the signal power estimating step comprises the steps of:

measuring power of the pilot signal by operating the separated pilot signal, selecting a power value of a first pilot signal and a power value of a second pilot signal, measured according to the TSTD pattern, the second pilot signal being transmitted from an antenna other than the antenna that has transmitted the first pilot signal, and operating power values of the selected pilot signals transmitted from the same antenna to estimate the signal power;

generating an interference power estimation signal from the channel signals transmitted in the TSTD mode of operation; and deciding power of a received signal by operating the signal power estimation signal and the interference power estimation signal.

26. The receiving method as claimed in claim 25, wherein the channel estimator comprises:

delaying the pilot signals;

selecting pilot signals transmitted from a same antenna that has transmitted a present pilot signal, by switching outputs of the buffers according to the TSTD pattern; and operating the pilot signals transmitted from the same antenna to generate the channel estimation signal.

27. The receiving method as claimed in claim 26, wherein the pilot signal separating step comprises the steps of:

separating the pilot signal and a data signal from the despread channel signals; and summing and dumping the separated pilot signal.

28. The receiving method as claimed in claim 27, further comprising the step of delaying the separated data signal to synchronize the data signal with the channel estimation signal.

29. The receiving method as claimed in claim 28, wherein the compensation step comprises the steps of:

conjugating the channel estimation signal; and multiplying the data signal by the conjugated channel estimation signal.

30. The receiving method as claimed in claim 25, wherein the interference power estimating step comprises the steps of:

measuring power of a signal transmitted in the TSTD mode of operation;

summing and dumping the measured signal power in a data group unit; and generating the interference power estimation signal by taking a reciprocal of the summed and dumped signal power.

31. The receiving method as claimed in claim 25, wherein the interference power estimating step comprises the steps of:

despreading the channel signals transmitted in the TSTD mode of operation using a specific spreading code;

measuring power of the despread signal;

summing and dumping the measured signal power in a data group unit; and generating the interference power estimation signal by taking a reciprocal of the summed and dumped signal power.

32. The receiving method as claimed in claim 25, wherein the pilot signal separating step comprises the steps of:

separating the pilot signal and a data signal from the despread channel signals; and summing and dumping the separated pilot signal.

* * * * *